United States Patent
Robey

(10) Patent No.: US 10,148,345 B2
(45) Date of Patent: Dec. 4, 2018

(54) ACCURATE TIMING DISTRIBUTION BY HIGH-FREQUENCY RADIO

(71) Applicant: Massachusetts Institute of Technology, Cambridge, MA (US)

(72) Inventor: Frank C. Robey, Concord, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 907 days.

(21) Appl. No.: 14/341,093

(22) Filed: Jul. 25, 2014

(65) Prior Publication Data

US 2015/0029058 A1    Jan. 29, 2015

Related U.S. Application Data

(60) Provisional application No. 61/858,817, filed on Jul. 26, 2013, provisional application No. 61/888,645, filed on Oct. 9, 2013.

(51) Int. Cl.
*H04B 7/22*  (2006.01)
*G01S 11/02*  (2010.01)
*G01S 13/02*  (2006.01)

(52) U.S. Cl.
CPC ............... *H04B 7/22* (2013.01); *G01S 11/02* (2013.01); *G01S 13/0218* (2013.01)

(58) Field of Classification Search
CPC .............. G01S 11/02; G01S 13/0218; G01S 5/021–5/221; G01S 19/23–19/235; H04B 7/22

See application file for complete search history.

(56) References Cited

U.S. PATENT DOCUMENTS

| | | | | |
|---|---|---|---|---|
| 3,170,120 A | * | 2/1965 | Jensen | G01S 13/52 327/557 |
| 3,881,154 A | * | 4/1975 | Lewis | H04B 7/22 342/26 R |

(Continued)

FOREIGN PATENT DOCUMENTS

WO    WO 2016/028354 A2    2/2016

OTHER PUBLICATIONS

Notification of Transmittal of the International Search Report and the Written Opinion of the International Searching Authority, or the Declaration, PCT/US2014/048177, dated Jan. 9, 2015, 1 page.

(Continued)

*Primary Examiner* — Cassi J Galt
(74) *Attorney, Agent, or Firm* — Daly, Crowley, Mofford & Durkee

(57) ABSTRACT

A method of obtaining an absolute time reference for a high-frequency (HF) sounding signal includes transmitting a reference signal at a first location and transmitting a sounding signal in close proximity to the transmitting of the reference signal at the first location. The method additionally includes receiving the reference signal at a second location and receiving the sounding signal at the second location. The method further includes determining a relative delay at the second location of the sounding signal in relation to the reference signal. The method also includes determining a propagation mode based upon the relative delay. The method additionally includes determining an absolute time reference based upon the propagation mode being observed. Additional methods and associated systems for implementing the methods are also provided.

20 Claims, 7 Drawing Sheets

(56) References Cited

U.S. PATENT DOCUMENTS

| | | | |
|---|---|---|---|
| 4,244,053 | A | 1/1981 | Clinch et al. |
| 5,230,076 | A | 7/1993 | Wilkinson |
| 5,278,870 | A | 1/1994 | Mays et al. |
| 6,259,894 | B1 * | 7/2001 | Tekinay .................... G01S 3/46 375/343 |
| 6,756,941 | B2 | 6/2004 | Martikkala |
| 7,187,905 | B2 | 4/2007 | Immonen et al. |
| 2007/0276598 | A1 | 11/2007 | Tillotson |
| 2009/0303124 | A1 | 12/2009 | Blake |
| 2010/0103902 | A1 | 4/2010 | Kim et al. |
| 2011/0279312 | A1 | 11/2011 | Thomson |

OTHER PUBLICATIONS

International Search Report, PCT/US2014/048177, dated Jan. 9, 2015, 4 pages.
Written Opinion of the International Searching Authority, PCT/US2014/048177, dated Jan. 9, 2015, 10 pages.
International Preliminary Report on Patentability dated Feb. 4, 2016 for PCT Application No. PCT/US2014/048177; 9 pages.

* cited by examiner

ACCURATE TIMING DISTRIBUTION BY HIGH-FREQUENCY RADIO

CROSS REFERENCE TO RELATED APPLICATION

This application claims the benefit under 35 U.S.C. § 119(e) of provisional application Ser. No. 61/858,817, entitled "ACCURATE TIMING DISTRIBUTION BY HF RADIO," filed Jul. 26, 2013 and also to provisional application Ser. No. 61/888,645, entitled "ACCURATE TIMING DISTRIBUTION BY HIGH-FREQUENCY RADIO," filed Oct. 9, 2013, both applications are hereby incorporated herein by reference in their entireties.

GOVERNMENT RIGHTS

This invention was made with Government support under Contract No. FA8721-05-C-0002 awarded by the U.S. Air Force. The Government has certain rights in the invention.

FIELD BACKGROUND

As is known in the art, prior to the invent of global positioning satellite (GPS) technology, accurate timing information was distributed by transmitting stable reference clock signals between different transmitter and receiver sites with each site having a stable reference clock free-running between synchronizations. Portable reference clocks were moved between locations to provide the necessary periodic synchronization. An alternative approach was to use time broadcasts from reference stations. The National Institute of Standards and Technology (NIST), for example, broadcasts reference clock signals as do time reference stations by other nations. Unfortunately, however, timing information distributed by NIST through transmissions of reference clock signals at WWV in Ft. Collins, Colo. and WWVH in Kauai, Hi., for example, as well as timing information distributed by other time reference stations, was never quite accurate enough to be used in precise timing applications for reasons that will shortly be discussed.

Given heavy reliance on GPS technology and the timing information distributed from such technology, there is present concern over how accurate timing information can and should be generated and distributed in the event that something should happen to GPS. This is especially true since the infrastructure for distributing timing information by free-running stable clocks and portable reference clock signals is largely no longer in place. For many time sensitive applications, high speed internet and accurate Network Time Protocol are adequate for distributing timing information. For other applications, however, such are inadequate. Consequently, there is a desire to increase the accuracy of received timing information that is distributed by the NIST radio stations (hereinafter, "NIST"), which broadcasts timing and frequency information traceable to an atomic time standard, as well as timing information distributed by other time reference stations.

NIST, for example, transmits high-frequency (HF) timing and frequency information 24 hours per day, 7 days per week from WWV and WWVH on 2.5, 5, 10, and 15 MHz frequencies, with each frequency being broadcast from a separate transmitter. WWV is also capable of transmitting timing and frequency information at a frequency of 20 MHz, while both WWV and WWVH are capable of broadcasting marine warnings, GPS status reports, leap second information, and geophysical alerts. The quality of HF signal reception in general varies from transmission to transmission due to a wide variety of factors including, but not limited to, atmospheric and ionospheric propagation conditions, distances from the transmitters to the receivers, and time of day, with different frequencies more easily received at different times of the day. Additionally, there are certain well-known difficulties which make HF radio transmission unreliable when only a single frequency is transmitted. For these reasons each frequency transmitted from NIST carries substantially the same information as the other frequencies transmitted, with multiple frequencies being used to improve HF signal reception. Utilizing a variety of frequencies makes it likely that a signal from at least one of the frequencies will be usable at all time.

One limitation on distributing accurate timing information from NIST, in addition to the above described issues with the quality of HF signal reception, is largely the uncertainty of the time delay from a transmitter at NIST to a receiver at a second location with the HF signal being "bounced" off of the earth's ionosphere. The received signal time must be compensated for the time required for the signal to propagate from NIST to the receiver. Complexities can also arise due to the existence of many potential propagation modes from the transmitter at NIST to the receiver. Distributing accurate timing information, and forming an absolute time reference, accordingly requires understanding the propagation mode over which the signal is received and compensating for such delay. Furthermore, the propagation mode and delays associated with each transmission from NIST changes over time. As a result, a new compensation value must be applied to each received transmission to match the particular environment and transmission path over which a signal with the timing information is sent.

Therefore, what is needed is a more robust receiver system for receiving and processing the accurate timing information transmitted by and received from NIST and the like, taking into account the issues discussed above.

SUMMARY

The present disclosure relates generally to devices configured to transmit and receive high-frequency (HF) signals for accurately setting time and for geolocation of receivers (e.g., with respect to transmitters). In particular, an alternative to using a global positioning system (GPS) is proposed for distribution of accurate timing information and for use in geolocation.

In accordance with example embodiments of the present disclosure, a system and a method of accurate distribution of timing of signals transmitted to and/or received from HF stations, such as the National Institute of Standards and Technology (NIST) WWV broadcasting station, and the like, is provided. The system and method described herein can be configured to utilize multiple-input multiple-output (MIMO) antenna technology and ionospheric modeling to correct for delays resulting from complex propagation paths. In one embodiment, determining an ionospheric model based upon relative delay includes estimating a distance from a transmitter transmitting a reference signal and/or the sounding signal at a first location to a receiver receiving the reference signal and/or the sounding signal at a second location. In one embodiment, determining an ionospheric model based upon relative delay includes estimating a distance from one or more transmitters transmitting a reference signal and/or a sounding signal at a first location to one or more receivers receiving the reference signal and/or the sounding signal at a second location, wherein the estimated distance from the one or more transmitters to the one or more receivers is combined to determine an absolute position of the one or more receivers.

A method of transmitting signals intended to characterize the propagation channel simultaneously with transmission of timing information so that time delays in the timing information due to the propagation channel can be compensated is also disclosed. The method involves concurrently broadcasting timing and sounding signals for propagation measurement. According to one embodiment, the signals are transmitted outside of the current NIST broadcast channel. According to another embodiment, the signals are narrowband, meaning that they are transmitted at each of the WWV frequencies.

Additionally, a method of using transmitted signals for characterizing a propagation channel and generating a propagation model is provided. The propagation model includes time delay information for each propagation mode between the transmitter and receiver.

Additionally, a method where the WWV transmissions are augmented to include real-time information on the ionospheric weather is disclosed.

Additionally, a method for determining a propagation mode of a transmitted signal based upon the timing information of the received signals is provided. According to one embodiment, this method further includes determining polarization information of the received signals.

Additionally, a method for generating polarimetric Multiple-Input, Single-Output (pMISO) signal transmissions such that a simple receiver can determine a propagation mode of received timing information is also disclosed.

Additionally, a method that includes both a more complex signal transmission and a polarimetric multichannel receiver for more accurate timing, referred to as polarimetric Multiple-input, Multiple-Output (pMIMO) is provided.

Additionally, a receiver architecture design that uses the harmonic relationship of the WWV transmissions to compress the frequency content is described. The receiver enables continuous reception of signals transmitted at all WWV frequencies with a low data rate or low bandwidth processing system.

Furthermore, a receiver design that simultaneously receives WWV transmissions, in addition to ionospheric sounding information, is disclosed. The receiver may be used to supply accurate time information to apparatus and systems requiring the determination of accurate time; e.g., clocks, speed measuring instruments, and devices used in combination with GPS instrumentation, timers, and the like.

The system and method disclosed herein provides a means of using time and frequency reference signals transmitted from WWV, WWVB, WWVH, and the like, to establish an absolute time reference. The absolute time reference can be used to synchronize transmitted time and frequency reference signals in the event that time reference information available from GPS sources becomes unavailable.

In accordance with the concepts, systems and techniques sought to be protected herein, a method of obtaining an absolute time reference for a high-frequency (HF) sounding signal includes at a first location, transmitting a reference signal; at the first location, transmitting a sounding signal in close time proximity to the transmitting of the reference signal; and receiving the reference signal at a second location. The method additionally includes receiving the sounding signal at the second location; determining a relative delay at the second location of the sounding signal in relation to the reference signal; determining a propagation mode based upon the relative delay; and determining an absolute time reference based upon the propagation mode being observed.

In one aspect, determining a propagation mode based upon the relative delay comprises determining a propagation mode based upon the relative delay; and determining an ionospheric model based upon the relative delay. Additionally, in one aspect determining an ionospheric model based upon the relative delay comprises determining an ionospheric model based upon the relative delay; and determining an absolute delay value based upon the ionospheric model. Moreover, in one aspect determining an ionospheric model based upon the relative delay comprises estimating a distance from a transmitter transmitting the reference signal and/or the sounding signal at the first location to a receiver receiving the reference signal and/or the sounding signal at the second location. In another aspect, determining an ionospheric model based upon the relative delay comprises estimating a distance from one or more transmitters transmitting the reference signal and/or the sounding signal at the first location to one or more receivers receiving the reference signal and/or the sounding signal at the second location, wherein the estimated distance from the one or more transmitters to the one or more receivers is combined to determine an absolute position of the one or more receivers.

In one aspect, the reference signal and the sounding signal are swept sounder signals, sweeping from below 2.5 MHz to above 20 MHz. In another aspect, the method of obtaining an absolute time reference for a HF sounding signal further comprises repeating the method for a plurality of reference signals and a plurality of sounding signals at one or more frequencies, to determine an absolute time reference for each of the one or more frequencies. In one aspect, the plurality of reference signals and the plurality of sounding signals are narrow-bend chirped or pulsed signals transmitted at each of the 2.5, 5, 10, 15 and 20 MHz frequencies.

Additionally, in accordance with the concepts, systems and techniques sought to be protected herein, a method of determining a propagation mode of a transmitted signal includes at a first location, modulating a signal to produce a modulated signal; transmitting the modulated signal to produce a transmitted signal; and receiving the transmitted signal at a second location. The method also includes processing the transmitted signal; determining a type of polarization based upon the processing of the transmitted signal; and determining the propagation mode of the transmitted signal based upon the type of polarization.

In one aspect, the signal is a surface wave signal. In another aspect, the signal is a signal refracted by the ionosphere. In one aspect, modulating a signal to produce a modulated signal comprises modulating the signal with an orthogonal code. In another aspect, modulating a signal to produce a modulated signal comprises modulating the signal with a delayed in time code. In another aspect, modulating a signal to produce a modulated signal comprises modulating the signal with a known code.

Additionally, in accordance with the concepts, systems and techniques sought to be protected herein, a method of obtaining an absolute time reference for a high-frequency (HF) sounding signal includes at a first location, transmitting a reference signal; at the first location, transmitting an ionospheric reference model signal; receiving the reference signal at a second location; and receiving the ionospheric reference model signal at the second location. The method also includes determining a relative delay at the second location of the sounding signal in relation to the ionospheric reference model signal; determining a propagation mode based upon the relative delay; and determining an absolute delay value based upon the propagation mode being observed. In one aspect, the ionospheric reference model signal is a digital signal.

Furthermore, in accordance with the concepts, systems and techniques sought to be protected herein, a receiver for simultaneously receiving one or more signals of a plurality of frequencies includes an antenna having an antenna port; an input conditioning circuit, wherein the input conditioning circuit is coupled to the antenna port; a comb filter, wherein an input of the comb filter is coupled to an output of the input conditioning circuit; and a decimator and a low-pass filter, wherein an input of the decimator and the low-pass filter is coupled to an output of the comb filter. The receiver additionally includes a sounder signal extractor, wherein an input of the sounder signal extractor is coupled to the decimator and the low-pass filter; a time/frequency extractor, wherein an input of the time/frequency extractor is coupled to an output of the decimator and the low-pass filter; and a propagation model, wherein an input of the propagation model is coupled to an output of the sound extractor. The receiver further includes a local time reference circuit; and a correction circuit, wherein the correction circuit is substantially configured to receive a time offset from the propagation model, an output signal from the time/frequency extractor, and a local time reference value from the local time reference circuit, wherein the correction circuit corrects the local time reference value based upon the inputs received from the propagation model, the time/frequency extraction circuit, and the local time reference circuit.

In one aspect, the plurality of frequencies comprise one or more WWV frequencies. Additionally, in one aspect the receiver is utilized with narrow-band sounding signals. Moreover, in one aspect the input conditioning circuit is coupled to a swept narrow-band receiver for processing swept sounder signals. Also, in one aspect the swept narrow-band receiver is implemented in analog signal processing. Additionally, in one aspect, the swept narrow-band receiver is implemented digitally in a software defined radio. Furthermore, in one aspect the swept narrow-band receiver is implemented with a combination of analog and digital processing elements.

BRIEF DESCRIPTION OF THE DRAWINGS

Features and advantages of the concepts, systems and techniques disclosed herein will be apparent from the following description of the embodiments taken in conjunction with the accompanying drawings in which.

DETAILED DESCRIPTION

The concepts, systems and techniques described herein are directed towards correction of received time reference signals transmitted from the National Institute of Standards and Technology (NIST), and similar high-frequency (HF) radio stations around the globe, to provide an absolute time reference for receiver devices and the like. The techniques described herein are generally based upon using reference broadcast signals and correcting for ionospheric delays, and understanding the propagation mode between a NIST transmitter (or similar HF transmitter) and a receiver in real-time through propagation models, for example. Other factors that affect the propagation of radio waves through the ionosphere, as will be apparent, are also taken into account.

Figure 1:
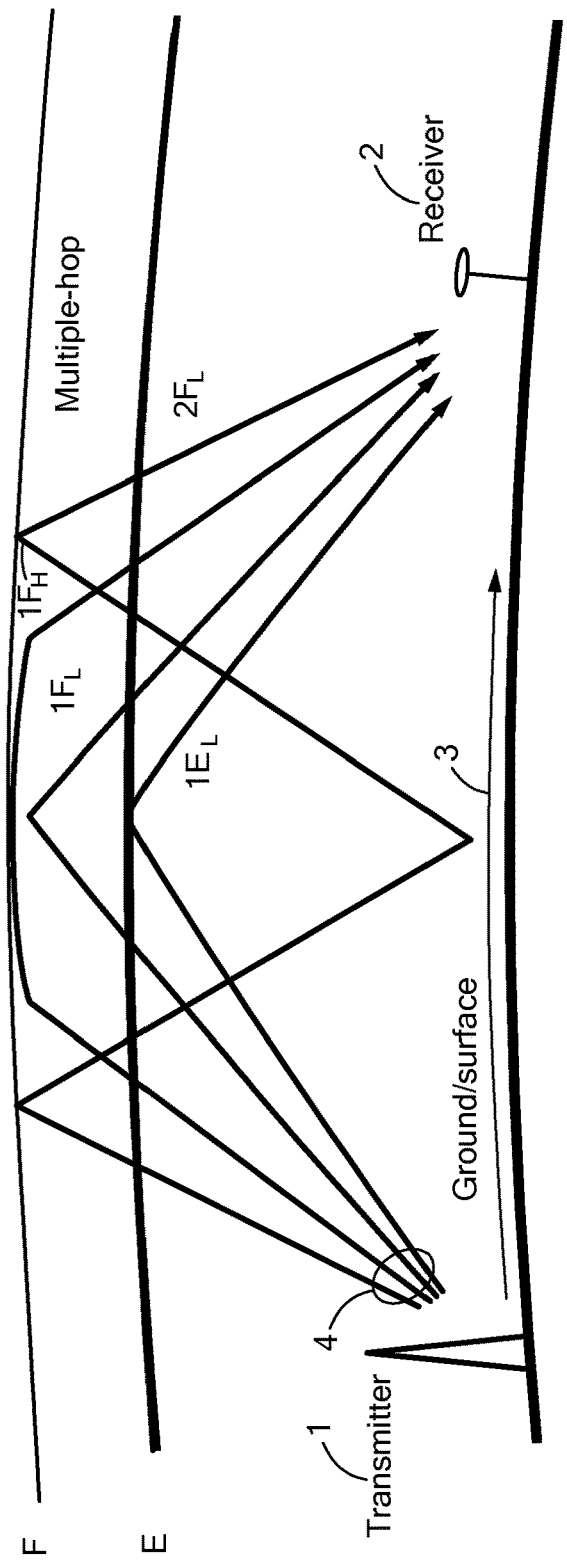
FIG. 1 is a plot of a high-frequency (HF) transmit-receiver system depicting example propagation modes that can exist at HF frequencies between a transmitter and a receiver.

Referring now to FIG. 1, illustrated are several potential propagation paths and modes that can exist for signals 4 transmitted at HF frequencies (also referred to herein as HF signals 4) between one or more transmitters 1 at a first location and received by one or more receivers 2 at a second location. As known, HF signals 4 can be carried for thousands of miles, with the HF signals 4 propagating from transmitters 1 to receivers 2 by refracting (or bouncing) off the ionosphere. The ionosphere is created by radiation, both electromagnetic and particles, coming from the sun which ionizes the Earth's upper atmosphere into free electrons and ions and extends from an altitude of about 50 km to 600 km where it merges with a near Earth space environment. The presence of the free electrons in the ionosphere effects the transmission of the HF signals 4. Depending upon the density of such free electrons, the range of movement of such free electrons, and the frequency and amplitude of the HF signals 4 the effects range from total absorption to selective reflection and phase delays of the HF signals 4. The above can lead to distortions in the HF signals 4 received at receiver 2 or even complete failures (i.e., the receiver 2 does not receive the HF signals 4) in extreme circumstances.

In addition to there being a potential propagation path along the surface of the earth 3, there are additional paths as shown in FIG. 1, along which the HF signals 4 can propagate through the ionosphere. Furthermore, the HF signals 4 can propagate along different paths depending upon their polarization. As a result, propagation paths and modes, such as those described above, must be taken into account through methods such as ionospheric modeling. As known, in ionospheric sciences the propagation mode of HF signals 4 transmitted through the ionosphere is typically denoted by the number of ionospheric bounces, the ionospheric layer, that is, E or F-layer, with the term "layer" referring to the ionization within a region, and then whether the propagation mode is low or high ray. The E-layer region lies between 90 and 150 km, and the F-layer region is the ionosphere above the E-layer region. All single-frequency GPS receivers, for example, must correct for the delay of a received GPS signal as it propagates through the ionosphere from a source (i.e. a transmitter) located on GPS satellites (22,000 km altitude) through the ionosphere to the GPS receivers. The existence of turbulence in the ionosphere, for example, can impact (in some cases significantly impact) the shape and form, and thus accuracy, of the HF signals 4 as they propagate through the ionosphere, and thus greatly impact communication and navigation systems.

Figure 1A:
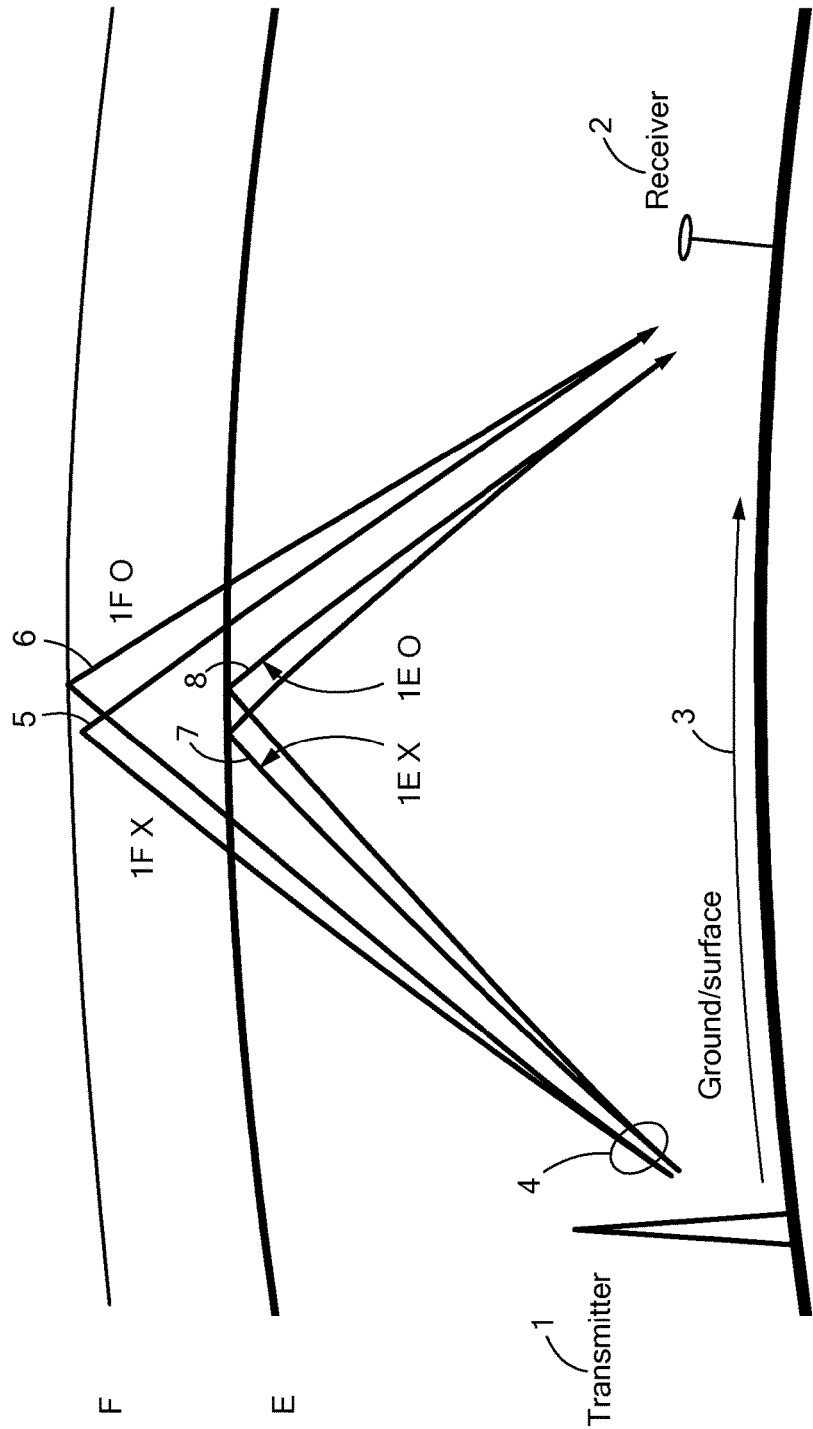
FIG. 1A is a plot of a HF transmit-receiver system depicting additional propagation modes that can exist at HF frequencies between a transmitter and a receiver.

In addition to the examples shown in FIG. 1, which can be considered some of the dominant propagation modes, there are several other less common propagation modes involving multiple ionospheric layers, ducted modes, and chordal modes. For each propagation mode, the earth's magnetic field combined with the ionosphere can result in the HF signals 4 splitting into right circular O rays (6, 8) and left circular X rays (5, 7), as shown in FIG. 1A. The O rays (6, 8) and X rays (5, 7), also denoted by 1E O, 1F O and 1E X, 1F X, respectively, each follow different paths, travel at different speeds, have different angles of arrival, and thus have different propagation delays relative to a receiver at which the signals are received. Additionally, due to varying ionospheric conditions, a phenomenon which changes depending upon location, time of day, time of year, and sun spot activity levels, for example, different portions of the HF signals 4 may or may not propagate in different directions at any given time of day. Furthermore, even though the changing state of the ionosphere is generally monitored by networks of vertical ionosondes, it is quite difficult to predict delays in transmission of HF signals 4 from transmitters 1 to receivers 2.

As a result of the above, it is challenging to accurately correct time reference signals received from NIST (and similar time reference stations) to provide an absolute time reference. The disclosure herein seeks to address the foregoing need. In particular, the disclosure provides two approaches for determining an absolute time reference, namely: (1) a first approach for forming an absolute time reference based upon analysis of various factors involved in the transmission and receiving of signals from NIST (and similar time reference stations), including knowledge of transmission times of sounding and time and frequency reference signals; and (2) a second approach for forming an absolute time reference based upon polarization analysis of signals transmitted from NIST (and similar time reference stations) through the utilization of polarization multiple-input, multiple-output (MIMO) antenna technology. This MIMO antenna technology allows for a refined understanding of the factors involved in the transmission and receiving of signals from NIST. The result of both of these approaches is the capability to provide an accurate absolute time reference.

Figure 2A:
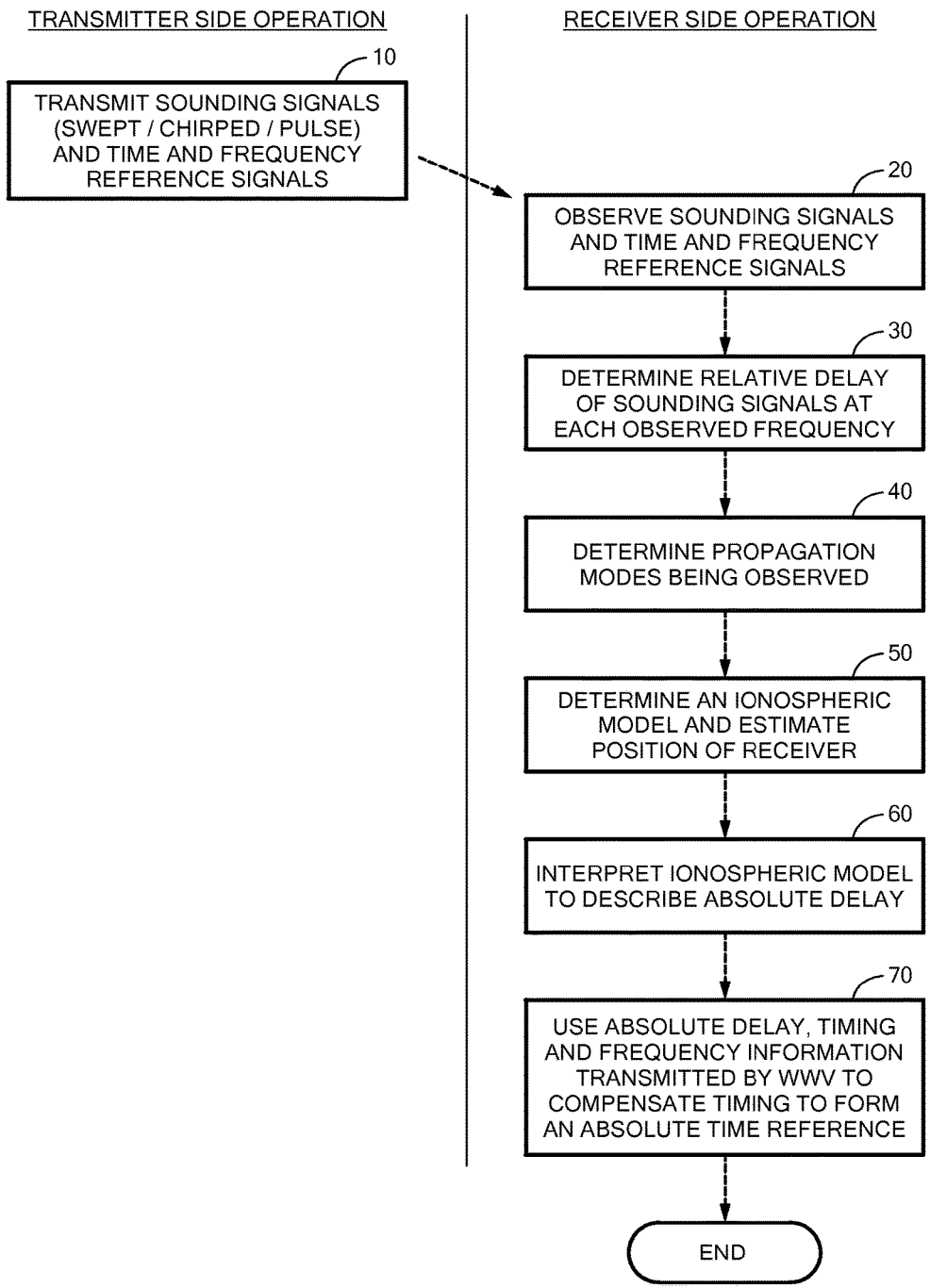
FIG. 2A is a flow diagram chart depicting an example method for determining an absolute time reference.

Referring to FIG. 2A, a flow chart illustrating an example method for determining an absolute time reference according to a first embodiment of the first approach described above in conjunction with FIG. 2 is shown. In particular, a transmitter (e.g. a transmitter at NIST) transmits sounding signals and time and frequency reference signals 10 in close time proximity. The time proximity should, for example, occur more rapidly than the changes. However, in certain (unusual) circumstances within several minutes would generally be sufficient. As is known, sounding signals are coded signals conventionally employed for testing and assessing the reception quality of one or more intended receivers and for determining the structure of the ionosphere. Sounding signals, in the present embodiment, are also sent for the purpose of characterizing the propagation delay of the time and frequency reference signals. These sounding signals can, for example, be sent and received on a plurality of different frequencies. In particular, these sounding signals can, for example, be swept sounder signals, sweeping from below 2.5 MHz to above 20 MHz, or narrow-band chirped or pulsed signals transmitted at each of the WWV frequencies. In the case of wideband swept sounder signals, the wideband sweeps are typically over a minimum of several minutes to avoid interference to other users in the band.

In the receiving system, a receiver observes the sounding signals and time and frequency reference signals 20 to determine a relative time delay of the sounding signals received at each of the observed frequencies 30 (e.g., 2.5, 5, 10, 15, and 20 MHz if transmitted from WWV) with respect to each other. The relative delay of the received sounding signals are subsequently compared against each observed frequency, as well as the time and frequency reference signals, and interpreted to determine a propagation mode being observed 40. In some embodiments the aforementioned can be used to determine an ionospheric model 50 and estimate a position (i.e., a geolocation) of the receiver with respect to the transmitter transmitting the sounding signals. It is to be appreciated that in determining the ionospheric model, the distance from the transmitter to the receiver becomes a natural part of the determination. For example, only certain modes will propagate between the transmitter and the receiver and relative delays between different modes is determined by the distance from the transmitter to the receiver. In one embodiment, determining an ionospheric model based upon relative delay includes estimating a distance from a transmitter transmitting a reference signal and/or the sounding signal at a first location to a receiver receiving the reference signal and/or the sounding signal at a second location. In one embodiment, determining an ionospheric model based upon relative delay includes estimating a distance from one or more transmitters transmitting a reference signal and/or a sounding signal at a first location to one or more receivers receiving the reference signal and/or the sounding signal at a second location, wherein the estimated distance from the one or more transmitters to the one or more receivers is combined to determine an absolute position of the one or more receivers.

The propagation mode and/or the ionospheric model are processed to describe an absolute delay from the transmitter to the receiver 60. With the absolute delay, and optionally knowledge of the amplitude, polarization, relative phase, time of flight, and dispersive spread of the transmitted sounding and time and frequency reference signals transmitted by WWV, for example, the receiver can compensate the timing of received signals to form an absolute time reference 70.

According to a second embodiment of the first approach, the transmitted sounding signals and time and frequency reference signals 10 are augmented to include space weather information in the form of an ionospheric model that is local to a particular NIST station (for example, WWV). Through knowledge of the ionospheric model, an absolute delay can be established from the transmitter to the receiver, thereby improving the accuracy of timing information distributed from NIST. This information can then be processed and expressed as an absolute delay from the transmitter to the receiver. With the absolute delay, the timing and frequency information transmitted by WWV can be used at the receiver to compensate the timing to form an absolute time reference 70. An ionospheric model may be determined through various ionosphere parameterizations. For example, the ionosphere may be characterized through ionosphere layer heights and thickness.

In another embodiment, information from both space weather information transmitted by NIST and sounding signals are combined to form an ionospheric model. Again, such model will be interpreted to describe the absolute delay from the transmitter to the receiver. With the absolute delay, the timing and frequency information transmitted by the NIST radio station can be used at the receiver to compensate the timing to form an absolute time reference 70.

When the transmitted signals 10 are received 20 at a receiver they are typically received over multiple paths simultaneously with their responses overlapping one another. This results in what is referred to in communications theory as a channel with a time spread impulse response. A channel impulse response is normally estimated in higher bit rate digital communication to improve bit error rates. In this case, the channel impulse response can be determined by using the sounding reference signals and different peaks in the impulse response can be related to the propagation mode to determine the absolute timing.

A second approach for relating observed signal delays to a propagation mode is based upon polarization analysis of radio wave signals transmitted from NIST through the utilization of polarization multiple-input, multiple-output (MIMO) antenna technology. As known, MIMO antenna technology offers significant increases in data throughput and link range without additional bandwidth or increased transmit power by spreading the same total transmit power over a plurality of antennas. According to a first embodiment of the second approach, signals that are received by surface wave are constrained to vertical linear polarization, and signals refracted by the ionosphere can be either right or left circular polarization with the polarization providing an indication of the path through the ionosphere. Information about the polarization of the signal for one-hop and surface modes can be obtained, for example, either by transmitting more complicated waveforms, by making a more complicated receive system, or by a combination of both.

To determine polarization of more complicated signals, multiple antennas are configured to transmit diversely polarized signals (e.g., each antenna is configured to transmit signals having a different polarization) can be used during a particular period of a transmission). The signal (i.e., polarized signal) on each of the polarization elements is modulated such that it is distinguishable from the signal on the other polarization elements. At the receiver, the diversely polarized signals can be combined to select for vertical linear, right circular, or left circular polarization. The modulation would normally be an orthogonal code (code division multiplexed), delayed in time (time division multiplexed), or frequency (orthogonal frequency division multiplexed, OFDM). WWV currently uses OFDM between WWV and WWVH to ensure that the signals do not interfere so this is a straightforward extension of that concept to polarization.

Polarization determination at a receiver may necessitate multiple receiver antenna elements, which according to one embodiment may be arranged along an orthogonal axis. By observing the phase and amplitude relationship between the signals received by each receiver antenna element, for example, the polarization of the incoming signals can be determined. In particular, in one embodiment antenna elements are coupled to a receiver or similar processing circuitry for converting the signals to a format where an amplitude and phase relationship can be directly computed and related to a signal of interest. In general, three polarization axes are needed. An added advantage of providing polarization sensing in the receiver is that many interference sources are linearly polarized and can be rejected using adaptive polarization processing.

According to a preferred embodiment, a receiver comprises a small HF receiver antenna such as a multi-resonant ferrite antenna, but it is not so limited. In the case of a receiver comprising multiple antenna elements, the first embodiment of each antenna element can be a ferrite rod or bar wound with multiple turns of wire as is currently used for shortwave radios. Since this type of antenna element is intended to operate over a wide fractional bandwidth and the antenna is electrically small, then there will be a loss in efficiency in the small HF receiver antenna. However, for most applications the loss in efficiency will generally not be a significant factor in system performance. As noted previously, determining polarization state of the received signals requires multiple antenna elements.

Figure 2B:
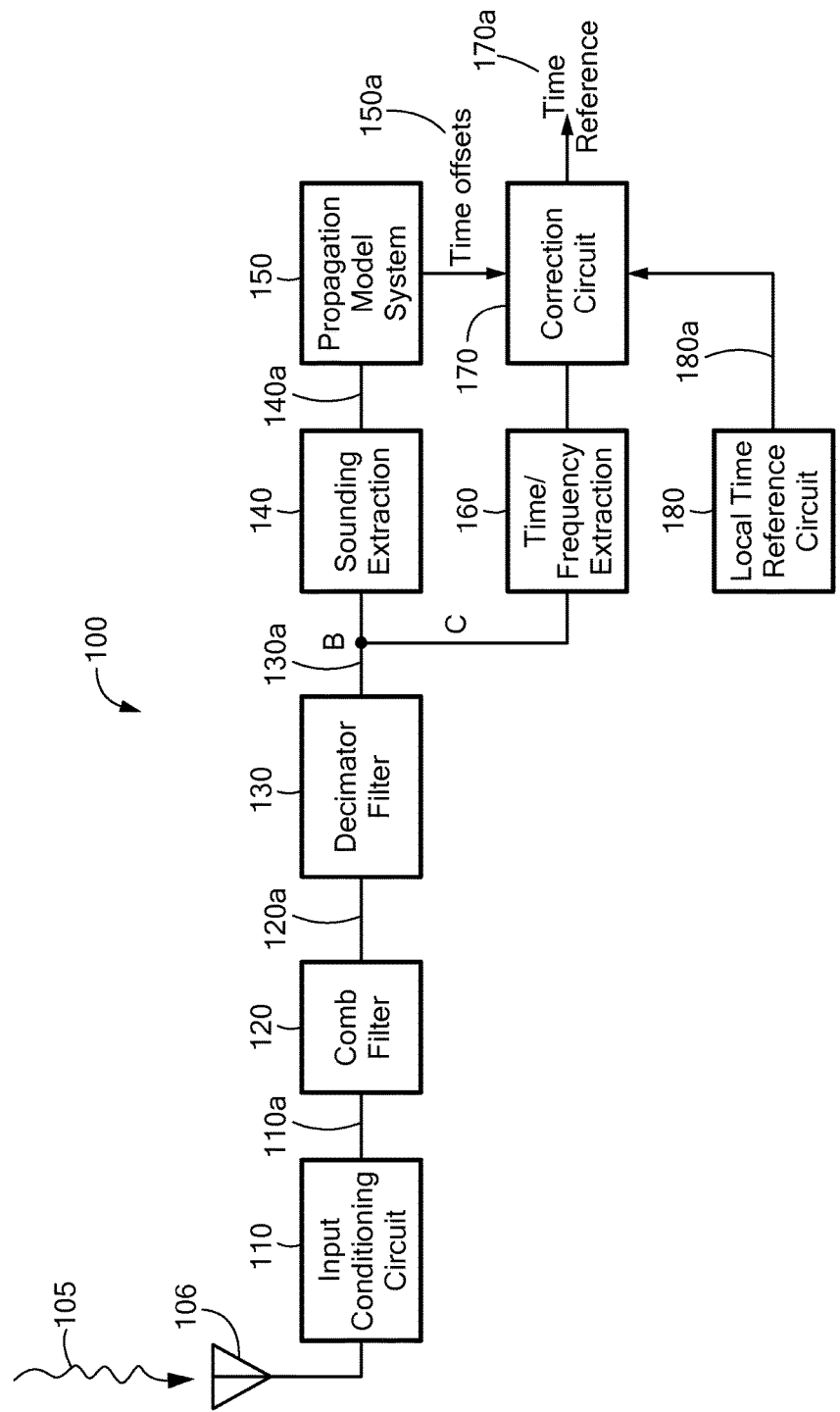
FIG. 2B is a block diagram of a receiver having a receiver architecture suitable for operation with a WWV frequency plan.

Referring to FIG. 2B, a high-frequency signal receiver 100 according to an example embodiment receives one or more sounding and time and frequency reference signals (collectively "timing signals" 105) from NIST, and the like, by an antenna 106 having an antenna port. The high-frequency signal receiver 100 is substantially capable of simultaneously receiving signals transmitted from all NIST station frequencies, and can operate in a manner which is the same as or similar to the receiver operation described above in conjunction with FIG. 2A. According to example embodiments, the described high-frequency signal receiver 100 could be prototype in an FPGA.

Additionally, according to example embodiments, the antenna 106 may be a loop antenna (e.g. a 3-axis cross-loop antenna), a dipole antenna, or a multi-resonant ferrite antenna. In accordance with another embodiment, the antenna 106 may be a polarimetric antenna. The timing signals 105a are coupled through antenna 106 to an input conditioning circuit 110.

The input conditioning circuit 110 filters the timing signals 105 from other unwanted signals and amplifies the timing signals 105 sufficiently for demodulation and decoding thereof to produce a filtered/amplified signal 110a. The filtered/amplified signal 110a is received by a conventional comb filter 120 which produces a combed signal 120a with a magnitude response comprising a comb-like shape of uniform weighting, as shown in FIG. 3C. The characteristic of an example comb filter is shown in FIG. 3B, as will be further discussed below.

The combed signal 120a output from the comb filter 120 is received by a decimator 130 comprising a low-pass filter and sampling circuit. The decimator 130 reduces the sampling rate of the input combed signal 120a to produce a decimated signal 130a. According to one example embodiment, the decimation factor (input rate/output rate) of the decimator 130 is dependent upon the particular receiver architecture. It will be apparent to one of skill in the art that reducing the sampling rate of the combed input signal 120a produces many advantages, including reducing the cost of processing. The calculation and/or memory required to implement the present receiver 100 is, according to some embodiments, substantially proportional to the sampling rate. As such, the use of a lower sampling rate may result in a "cheaper" (i.e., less resource intensive) implementation. Decimation and removing of the empty spectrum after the comb filtering may be accomplished using any technique known to one of ordinary skill in the art. Example techniques will be discussed further in FIG. 3B. It is notable that processing through nodes B and C may be accomplished by analog circuitry, switch capacitor circuits, or digital signal processors.

As indicated by nodes B and C in FIG. 2B, the decimated signal 130a is received by a sounding extractor 140 and a time/frequency extraction circuit 160, respectively. At node B, the sounding extractor 140, according to one example embodiment, is a narrow-band sounding that sounds around the WWV frequencies (2.5, 5, 10, and 15 Mhz). The sounding extractor 140, which can be of a multiple-input and multiple-output (MIMO) architecture in some embodiments, processes the decimated signal 130a to produce an extracted sounder signal 140a. The extracted sounder signal 140a is received by a propagation model system 150, which determines a propagation model of the received timing signals 105 (particularly the sounding signal portion of the timing signals 105) and a position (or geolocation) of receiver 100 with respect to the transmitter (not shown) based upon the extracted sounder signal 140a. Example propagation models will be apparent to those of skill in the art. The propagation model system 150 calculates timing offsets 150a associated with the sounding signal portion of the timing signals 105 with respect to the time and frequency reference portion of the received timing signals 105 based upon the determined propagation model. The propagation model system 150 provides the time offset value 150a to a correction circuit 170.

At node C, the time/frequency extraction circuit 160 extracts selected time and frequency information from the decimated signal 130a to produce an extracted time and frequency signal 160a, which is received by the correction circuit 170.

At node D, a local time reference circuit 180 provides a local time reference signal 190a to an input of the correction circuit 170.

The correction circuit 170 receives the signals provided thereto from the propagation model 150 system, time/frequency extraction circuit 160, and the local time reference circuit 180, to generate an absolute time reference 170a. The absolute time reference 170a may, for example, be calculated by a phase-lock loop (PLL) control system wherein the absolute time reference 170a is related to the phase of the input signals or any other suitable means that may be apparent to one of skill in the art. This absolute time reference 170a can then be used to supply accurate time information to apparatuses and systems requiring the determination of accurate time.

In one example embodiment, the correction circuit 170 may comprise a digital processor to process the timing offsets 150a, extracted time and frequency signal 160a, and local time reference signal 180a. The digital processor may be an industry standard processor, e.g., microcontroller, microprocessor, programmable logic array (PLA), application specific integrated circuit (ASIC), digital signal processor (DSP) and the like. In another example embodiment of the disclosure, the digital processor may perform the functions of the correction circuit, thus eliminating the need for the correction circuit 170.

It should be appreciated that high-frequency signal receiver 100 of FIG. 2B and the operation thereof assumes that only narrow-band sounding signals are received by antenna 105. In the alternative, if swept sounder signals are received by antenna 105, timing signals 105a may be received by a narrow-band receiver (not shown) after being processed by input conditioning circuit 110. Such swept narrow-band receiver (not shown) could be implemented in an analog signal processor with a swept local oscillator, digitally in software defined radio, or any combination of analog and digital.

Figure 3A:
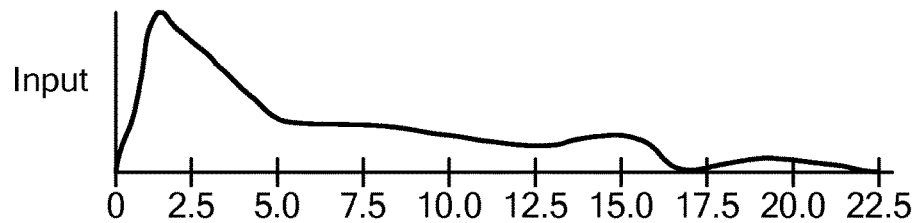
FIG. 3A is a plot of input signal magnitude vs. frequency for an input signal provided to the input of a receiver having a receiver architecture which may be the same as or similar to the receiver of FIG. 2B.
Figure 3B:
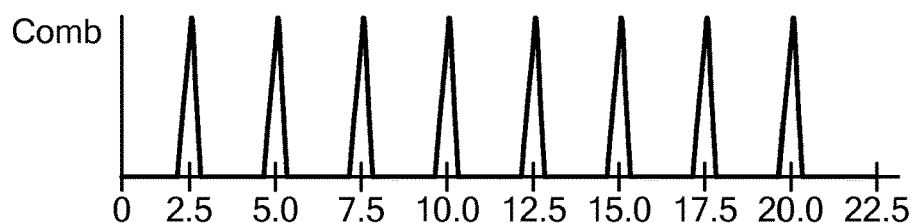
FIG. 3B is a plot of comb filter output signal magnitude vs. frequency for a receiver having a receiver architecture which may be the same as or similar to the receiver of FIG. 2B.
Figure 3C:
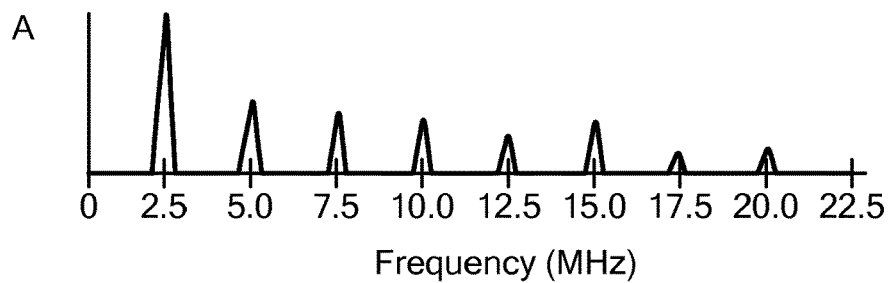
FIG. 3C is a plot of signal magnitude vs. frequency at point A in the receiver of FIG. 2B.

Referring now to FIGS. 3A-3D, the frequency response of an example input signal and example input signal after various processing steps of the high-frequency signal receiver 100 of FIG. 2B are shown. FIG. 3A is an example output of the input conditioning circuit 110 described above with respect to FIG. 2B.

Referring now to FIGS. 3B and 3C, the output of the input conditioning circuit shown in FIG. 3A propagates through the comb filter of FIG. 3B to yield the combed signal shown in FIG. 3C. As depicted in FIG. 3C, the comb filter of FIG. 3B separates the input signal of FIG. 3A into a series of regularly spaced signals based up on uniform weighting. As will be apparent to one of skill in the art, there are several techniques for decimating and removing the empty spectrum of the combed signal, which is produced after passing through the input of the comb filter 120. For example, if the sampling rate is 2.5 MHz-x kHz, then the center of a 2.5 MHz WWV transmission will mix or alias to be centered at x kHz, the 5 MHz transmission will alias to 2x, 10 MHz to 4x, 15 MHz to 6x, and 20 MHz to 8x. x can be either positive or negative and in general x would be less than 125 for efficient spectral compacting. The above technique allows all of the WWV transmissions of interest to be represented in a compact form packed into a lower overall bandwidth.

Figure 3D:
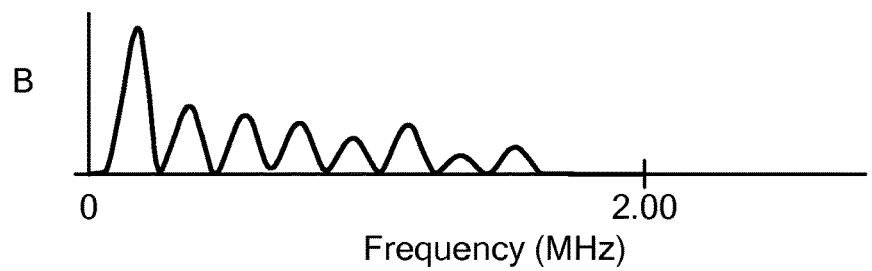
FIG. 3D is a plot of signal magnitude vs. frequency at point B in the receiver of FIG. 2B.

The combed signal of FIG. 3C is then applied to a decimator with a low-pass filter to produce the appropriately decimated and filtered signal of FIG. 3D. The signal is attenuated based upon the cutoff frequency set for the low-pass filter, which is based upon the amount of decimation desired. The amount of decimation desired depends upon the complexity of the signal being processed.

Figure 4:
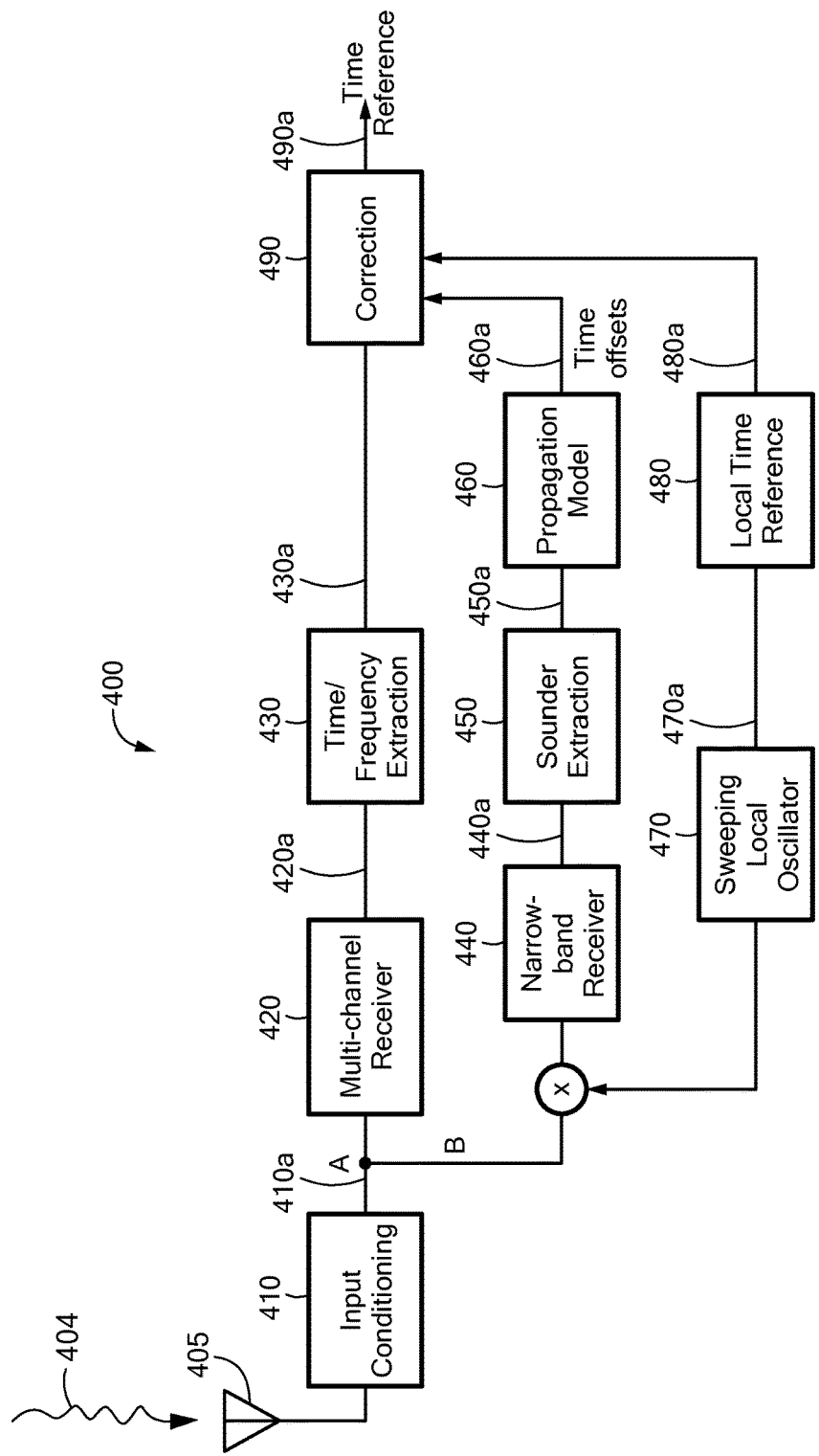
FIG. 4 is a block diagram of an example receiver system in which swept sounder signals are received in parallel with data transmissions on a single receiver.

Referring now to FIG. 4, a block diagram of an alternative high-frequency signal receiver 400 substantially capable of receiving swept sounding signals and time and reference signals from WWV, and the like, in parallel is shown. The alternative receiver 400 combines the functionality of a sounding signal reception receiver and a WWV data transmissions receiver into a single module, thereby reducing the hardware needed for the receiver system and method disclosed herein. In particular, it is envisioned that utilizing a single receiver enhances the advantages associated with the receiver system and method disclosed herein.

As depicted in FIG. 4, an example receiver 400 in accordance with another embodiment comprises an input conditioning circuit 410, a multi-channel receiver 420, a time/frequency extraction circuit 430, a narrow-band receiver 440, a sounder extraction circuit 450, a propagation model 460, a sweeping local oscillator 470, a local time reference circuit 480, and a correction circuit 490, which will be described in further detail below.

Swept sounding signals and time and reference signals from WWV, and the like, may be received by an antenna 405 comprising an antenna port, wherein the received swept sounder and time and reference signals (collectively, "timing signals" 404) are coupled through antenna 405 to an input conditioning circuit 410.

The input conditioning circuit 410 filters the timing signals 404 from other unwanted signals and amplifies the timing signals 404 sufficiently for demodulation and decoding thereof to produce one or more filtered/amplified input signals 410a corresponding to the received timing signals 404. The filter/amplified input signal 410a generated from the timing signals 404 is received by the multi-channel receiver of node A.

The multi-channel receiver 420 is adapted to receive one or more timing signals 404, more particularly one or more timing signals at the various WWV transmission frequencies. The receiver 420 comprises one or more demodulators for processing and demodulating the according timing signals 404.

The filtered/amplified input signal 410a received by the multi-channel receiver 420 is applied to a time/frequency extraction circuit 430, which extracts select time and frequency information from the filtered/amplified input signal 410a to produce and extracted time and frequency signal 430a. The extracted time and frequency signal 430a is received by a correction circuit 490.

The filtered/amplified input signal 410a is also received by the narrow-band receiver 440 of node B. The narrow-band receiver 440 comprises a demodulator for performing signal demodulation upon the received filtered/amplified input signal 410a to produce a narrow-band output signal 440a. According to one embodiment, the narrow-band receiver 440 may further comprise a control module couple to the demodulator for controlling an operation of the demodulator.

The narrow-band output signal 440a is received by a sounding extractor 450. According to one example embodiment, the sounding extractor 450 is a narrow-band sounder that sounds around the WWV frequencies (2.5, 5, 10, and 15 Mhz). The sounding extractor 450, which comprises multiple-input and multiple-output (MIMO) architecture in one embodiment, processes the narrow-band output signal 440a to produce an extracted sounder signal 450a. The extracted sounder signal 450a is received by a propagation model system 460, which determines a propagation model of the narrow-band output signal 440a and a position (or geolocation) of the receiver 400 with respect to the transmitter (not shown) based upon the extracted sounder signal 450a. Example propagation models will be apparent to those of skill in the art. The propagation model system 460 estimates a direction of propagation of the timing signals 405a; and calculates timing offsets 460a of the extracted sounder signal 450a with respect to time and frequency reference portions of the timing signals 405a based upon the determined propagation model. The propagation model system 460 provides the timing offsets 460a to correction circuit 490.

The correction circuit 490 receives the signals provided thereto from the propagation model 460 system, time/frequency extraction circuit 430 and the local time reference circuit 480, and is substantially configured to calculate an absolute time reference 490a. The absolute time reference 490a may be calculated by a phase-lock loop (PLL) control system, wherein the generated absolute time reference 490a is related to the phase of the timing signals 405a, or any other suitable means that may be apparent to one of skill in the art. Such absolute time reference 490a can be used to supply accurate time information to apparatuses and systems requiring the determination of accurate time.

Figure 5:
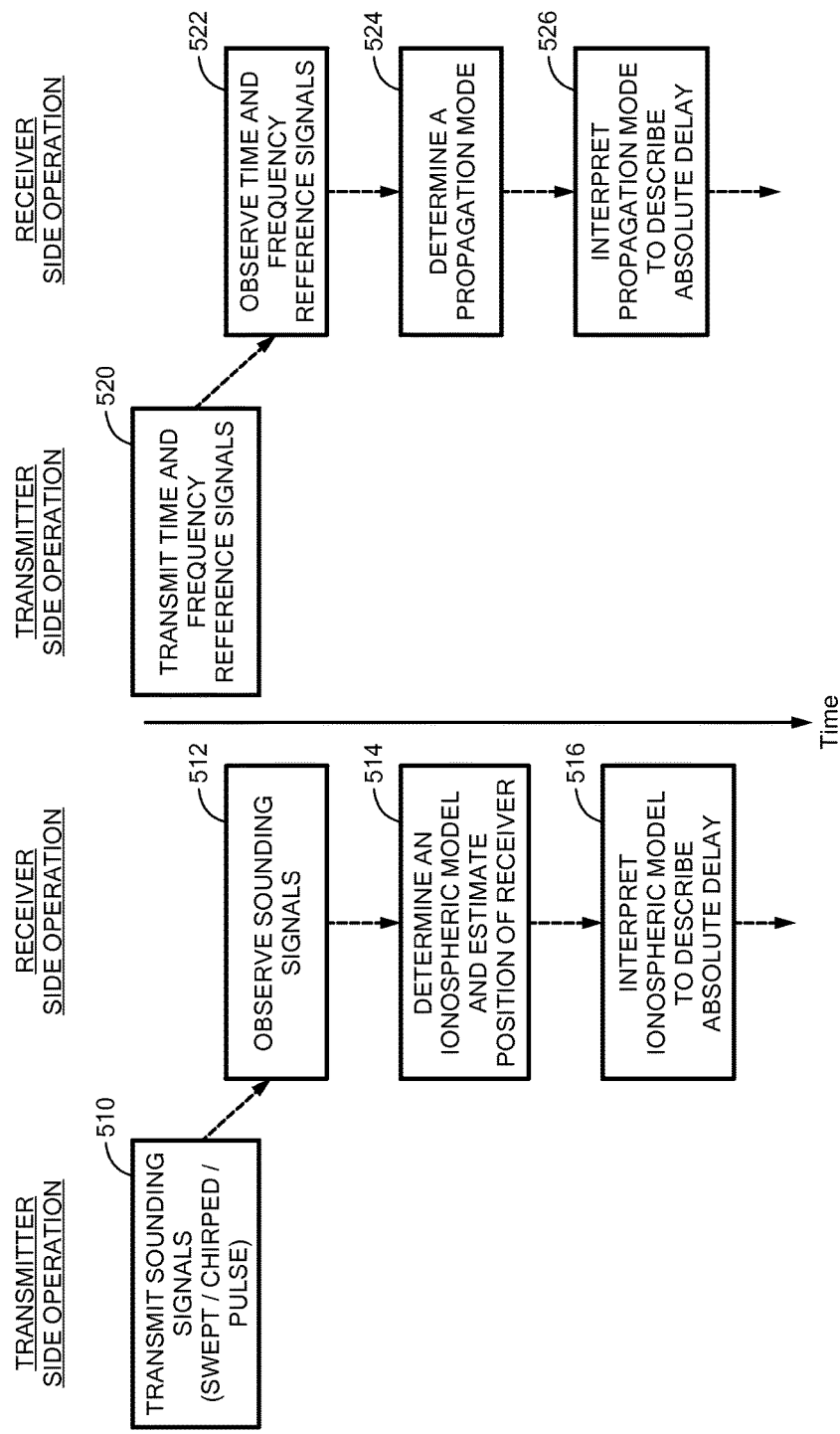
FIG. 5 is a flow chart depicting another example method for determining an absolute time reference.

Referring to FIG. 5, a flow chart illustrates another example method for determining an absolute time reference. This example method can replace or be combined with the method for determining an absolute time reference shown in FIG. 2A. A transmitter is configured to generate and transmit a plurality of sounding signals 510 and time and frequency reference signals 520 over multiple frequencies, with the plurality of soundings signals 510 being swept, chirped, or pulse frequency sounding signals. The transmitter can operate in a manner which is the same as or similar to the transmitter operation described above in conjunction with FIG. 2A. In one embodiment, the transmitter comprises a plurality of transmitters configured to transmit the plurality of sounding 510 and time and frequency reference 520 signals from all or a subset of the transmitters. Ideally, the plurality of sounding 510 and time and frequency reference 520 signals are transmitted simultaneously over the substantially the same transmission path. The signals 510, 520 can be transmitted over a number of frequency bands of interest, which may be all of the WWV or WWVH frequencies. Alternatively, the plurality of sounding 510 and time and frequency reference 520 signals can be transmitted at different time intervals, with the difference between the time intervals being taken into account in computing an absolute delay value 516, 526. The transmitter may, for example, store and/or share the difference with a receiver which may operate in a manner which is the same as or similar to the operation of the receiver described above in conjunction with FIG. 2A.

The receiver is configured to observe and process the plurality of sounding signals 512 at the same multiple frequencies of the transmitter to determine an ionospheric model of the plurality of sounding signals received at each of the observed frequencies 514 and a position (or geolocation) of the receiver with respect to the transmitter. Additionally, the receiver is configured to observe and process the time and frequency reference signals 522 at the same multiple frequencies of the transmitter to determine a propagation mode being observed at each of the observed frequencies 524. The sounding 510 and time and frequency reference 520 signals can also be used to derive the ionospheric model and the propagation mode, respectively, in real-time. The receiver can, for example, combine the ionospheric model and propagation mode information with archived data and propagation algorithms in interpreting the ionospheric model to describe absolute delay 516 and determine the relative delays of the sounding signals 510 at each observed frequency 526.

In some embodiments the receiver can utilize a lookup table in determining the ionospheric model 514 and the propagation mode 524. The lookup table may include a tabulation of data that was previously received by the receiver. For the ionospheric model this may include information such as the location, altitude, day of year, phase of sunspot cycle, and geomagnetic activity of previously received signals. The lookup table may, for example, be stored in a memory device of the receiver and be accessed as needed. Additionally, the accuracy of the determined propagation mode 524 and ionospheric model 514 may be verified and corrected as necessary. For example, the ionospheric model may be corrected for errors resulting from changes in the ionosphere.

In order to model the real-time behavior of the ionosphere, the hourly and daily variability in the various layers of the ionosphere may also be taken into account in determining the ionospheric model 514. According to one embodiment, the receiver calculates an ionospheric model 514 (and a position of the receiver with respect to the transmitter) through a standard set of codes such as those associated with, for example, the International Reference Ionosphere at the desired time.

The determined propagation model 524 can also be updated given an estimate of expected solar activity, time of day, and the transmitter and receiver antenna patterns. Additionally, the determined propagation model 524 can further be updated by using a weighted average of old propagation data and new observed propagation data. Furthermore, the determined propagation model 524 may be dynamically determined by rerunning ionospheric model calculations periodically (e.g., daily). With the above arrangement, the method disclosed herein provides for determining an absolute time reference with real-time ionospheric and propagation model correction.

The determined ionospheric model 514 and the propagation modes being observed 524 can be interpreted to describe an absolute delay from a transmitter to a receiver and a position (or geolocation) of the receiver with respect to the transmitter. The absolute delay may, for example, be computed entirely within receiver, allowing for a self-contained system. As discussed above, in determining the ionospheric model, the distance from the transmitter to the receiver becomes a natural part of the determination. For example, only certain modes will propagate between the transmitter and the receiver and relative delays between different modes is determined by the distance from the transmitter to the receiver. In instances where signals are received at the receiver from multiple reference stations (i.e., transmitters), the distance estimated from each transmitter can be combined through spherical geometry to determine the location of the receiver in a manner similar to how the signals received from a low frequency system are processed.

With the absolute delay, the timing and frequency information transmitted by WWV can be used at a receiver to compensate the timing to form an absolute time reference. Additionally, with knowledge of the absolute delay, the time and frequency reference signals sent from a transmitter at 520 can be adjusted accordingly. Ideally, with a known absolute delay, a majority of the transmission delays resulting from the ionosphere can be accounted for. The absolute delay value can also be used to provide information regarding propagation uncertainties, propagation parameters and frequency changes.

Other systems, methods, features and advantages of the concepts described herein will be or will become apparent to one with ordinary skill in the art upon examination of the following figures and detailed description. It is intended that all such additional systems, methods, features and advantages be included within this description, be within the scope of the concepts described herein, and be protected by the accompanying claims.

For example, those of skill in the art will recognize that the system and techniques disclosed herein can be utilized in conjunction with other radio broadcast time sources in addition to WWV and WWVH, including those transmitted by WWVB and local network time sources.

It will be understood that although the foregoing description details methods and systems for creating an accurate time reference in the absence of GPS, it is to be recognized that that the concepts, system and techniques are not limited thereto operation in the absence of GPS. Therefore, any and all variations and modifications that may occur to those of ordinary skill in the art are to be considered as being within the scope and spirit of the concepts, systems and techniques sought to be protected herein.

What is claimed is:

1. A receiver for simultaneously receiving one or more input signals of a plurality of frequencies, the receiver comprising:
    an antenna having an antenna port;
    an input conditioning circuit having an input coupled to the antenna port;
    a comb filter having an input coupled to an output of the input conditioning circuit;
    a decimator including a low-pass filter, the decimator having an input coupled to an output of the comb filter;
    a digital signal processor configured to:
        receive a decimated signal from an output of the decimator and in response thereto generate an extracted sounder signal;
        extract selected time and frequency information from the decimated signal to produce an extracted time and frequency signal; and determine a propagation model of the input signals based upon the extracted sounder signal, and a time offset based upon the propagation model;
    a local time reference circuit to generate a local time reference value; and a correction circuit configured to receive the time offset, the extracted time and frequency signal and the local time reference value at respective inputs, and in response thereto correct the local time reference value.

2. The receiver of claim 1, wherein the plurality of frequencies comprise one or more WWV frequencies.

3. The receiver of claim 1, wherein the input signals include narrow-band sounding signals.

4. The receiver of claim 1, wherein the input conditioning circuit is coupled to a swept narrow-band receiver for processing swept sounder signals.

5. The receiver of claim 4, wherein the swept narrow-band receiver is implemented in analog signal processing.

6. The receiver of claim 4, wherein the swept narrow-band receiver is implemented digitally in a software defined radio.

7. The receiver of claim 4, wherein the swept narrow-band receiver is implemented with a combination of analog and digital processing elements.

8. The receiver of claim 1, wherein the input conditioning circuit is configured to receive the input signals from the antenna port, and configured to filter timing signals of the input signals from other signals of the input signals.

9. The receiver of claim 8, wherein the input conditioning circuit is further configured to amplify the timing signals sufficiently for demodulation and decoding thereof.

10. The receiver of claim 9, wherein the comb filter is configured to receive a filtered and amplified signal from the input conditioning circuit at the comb filter input, and in response thereto generate a combed signal with a magnitude response having a comb-like shape of substantially uniform weighting at the comb filter output.

11. The receiver of claim 10, wherein the decimator is configured to receive the combed signal from the comb filter at the decimator input, and in response thereto generate the decimated signal, wherein the combed signal has a first sampling rate and the decimated signal has a second sampling rate that is substantially less than the first sampling rate.

12. The receiver of claim 1, wherein the input signals include: sounding signals, and time and frequency reference signals, and wherein the extracted sounder signal is based upon sounding signal portions of the decimated signal.

13. The receiver of claim 12, wherein the time offset corresponds to an offset between the sounding signals and the time and frequency signals.

14. The receiver of claim 1, wherein the correction circuit is further configured to generate an absolute time reference at an output of the correction circuit in response to correcting the local time reference value.

15. The receiver of claim 1, wherein the antenna is a loop antenna, a dipole antenna, or a multi-resonant ferrite antenna.

16. The receiver of claim 1, wherein the antenna is a polarimetric antenna.

17. A method, comprising:
simultaneously receiving one or more input signals of a plurality of frequencies at an antenna of a receiver;
filtering timing signals of the input signals from other signals of the input signals, and amplifying the timing signals, using an input conditioning circuit of the receiver to generate a filtered and amplified signal;
filtering the filtered and amplified signal with a comb filter of the receiver to produce a combed signal;
generating a decimated signal with a decimator of the receiver in response to the combed signal, the decimator including a low-pass filter;
generating an extracted sounder signal using a digital signal processor of the receiver in response to the decimated signal, wherein the extracted sounder signal is based upon sounding signal portions of the decimated signal;
extracting selected time and frequency information using the digital signal processor from the decimated signal to produce an extracted time and frequency signal;
determining a propagation model of the input signals using the digital signal processor based upon the extracted sounder signal;
determining a time offset of the input signals using the digital signal processor based upon the propagation model;
generating a local time reference value with a local time reference circuit of the receiver;
receiving the time offset, the extracted time and frequency signal and the local time reference value at respective inputs of a correction circuit of the receiver; and
correcting the local time reference value with the correction circuit based upon the time offset and the extracted time and frequency signal.

18. The method of claim 17, further comprising:
generating an absolute time reference at an output of the correction circuit in response to correcting the local time reference value.

19. The method of claim 17, wherein filtering the filtered and amplified signal with a comb filter comprises: filtering the filtered and amplified signal with a comb filter of the receiver to produce a combed signal with a magnitude response having a comb-like shape of substantially uniform weighting.

20. The method of claim 17, wherein generating a decimated signal further comprises: generating the decimated signal such that the combed signal has a first sampling rate and the decimated signal has a second sampling rate that is substantially less than the first sampling rate.

* * * * *